US010929622B1

(12) United States Patent
O'Hagan et al.

(10) Patent No.: US 10,929,622 B1
(45) Date of Patent: Feb. 23, 2021

(54) PASSIVE CALL BUTTON AND SYSTEMS AND METHODS ASSOCIATED THEREWITH

(71) Applicant: ZEBRA TECHNOLOGIES CORPORATION, Lincolnshire, IL (US)

(72) Inventors: James J. O'Hagan, McHenry, IL (US); Daniel F. Donato, Johnsburg, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/600,332

(22) Filed: Oct. 11, 2019

(51) Int. Cl.
G06K 7/00 (2006.01)
G06K 7/10 (2006.01)
G06K 19/07 (2006.01)

(52) U.S. Cl.
CPC ..... G06K 7/10366 (2013.01); G06K 19/0723 (2013.01)

(58) Field of Classification Search
CPC ............... G06K 7/10366; G06K 7/10138
USPC .......................................... 235/451; 340/10.1
See application file for complete search history.

(56) References Cited

U.S. PATENT DOCUMENTS

| | | | | |
|---|---|---|---|---|
| 2002/0109593 | A1* | 8/2002 | Swartzel | G06Q 10/087 340/540 |
| 2012/0091162 | A1* | 4/2012 | Overhultz | A47F 1/126 221/1 |
| 2012/0274449 | A1* | 11/2012 | Wilkinson | H05K 999/99 340/10.1 |
| 2018/0268446 | A1* | 9/2018 | Jones | H04L 67/18 |
| 2018/0285708 | A1* | 10/2018 | Morgan | G06K 7/10009 |
| 2018/0308042 | A1* | 10/2018 | Taulbee | G06Q 10/087 |
| 2019/0171922 | A1* | 6/2019 | Matsushita | G06K 7/10059 |
| 2020/0050808 | A1* | 2/2020 | McAllister | G06K 7/10356 |

* cited by examiner

Primary Examiner — Allyson N Trail
(74) Attorney, Agent, or Firm — Yuri Astvatsaturov

(57) ABSTRACT

Systems and methods for detecting an event within a monitored area are provided. A transmitter emits an RF interrogation signal into the monitored area. An RF target positioned within the monitored area reflects the interrogation signal as a target signal when the interrogation signal impinges on the RF target. The RF target has a switch actuatable by a user between a switch-state in which the RF target operates in a first reflective state, and a switch-state in which the RF target operates in a second reflective state. A receiver receives the target signal from the RF target. Based on the target signal received by the receiver, a processor can detect an indication of the reflective state in which the RF target is operating. The processor triggers an action in response to the indication of the reflective state in which the RF target is operating.

35 Claims, 5 Drawing Sheets

US 10,929,622 B1

PASSIVE CALL BUTTON AND SYSTEMS AND METHODS ASSOCIATED THEREWITH

BACKGROUND OF THE INVENTION

In an inventory or retail venue, passive radio frequency identification (RFID) tags may be used to identify or track items. Generally speaking, these passive RFID tags modulate a radio frequency (RF) signal with a unique identifier that may be read by an RFID reader to identify the tag and associate it with an item.

However, in addition to identifying or tracking items in inventory or retail venues, there is currently also a need to identify events that occur in these venues. Current systems require additional infrastructure that may be bulky, difficult to configure, and expensive, making them unsuitable. Accordingly, there exists a need for a compact, inexpensive, easily configured system that can detect certain events and provide alerts.

SUMMARY

In an embodiment, the present invention provides a system through which an event (e.g., a user interaction) associated with a passive radio frequency (RF) target is detected based on analysis of both an RF signal reflected by the RF target and associated data. In an embodiment, a user interacts with the RF target by activating a button that causes the RF target to switch between different reflective states. In an embodiment, for example, a user may activate the button, causing the RF target to operate in the first reflective state, in order to indicate that a certain product is out of stock, or may reversibly activate the button, causing the RF target to operate in the second reflective state, in order to indicate that the product is stocked. As another example, in an embodiment, a user may activate the button, causing the RF target to operate in the first reflective state, to indicate that the user is requesting assistance at a position, but when the button is not pressed, the RF target operates in the second reflective state, indicating that no customer is requesting assistance at the position.

In an embodiment, for instance, when the RF target operates in the first reflective state, the RF target reflects an RF signal, while when the RF target operates in the second reflective state, the RF target does not reflect an RF signal. For example, in an embodiment, when the RF target operates in the first reflective state, an RFID reader will receive a reflected RF signal, indicating that the product is out of stock, but when the RF target operates in the second reflective state, the RFID reader will receive no reflected RF signal, indicating that the product remains stocked. As another example, when the RF target operates in the first reflective state, the receiver will receive a reflected RF signal with a certain polarity, indicating that a customer is requesting assistance at a position, but when the RF target operates in the second reflective state, the receiver will receive a RF signal having a different polarity, indicating that no customer is requesting assistance at the position. Consequently, a processor associated with the receiver can trigger an action (e.g., generating a notification regarding the product that is out of stock, ordering additional product, notifying a customer service representative that a customer needs assistance at a location, etc.) based on the reflected RF signal (or lack thereof) that is received.

In an embodiment, the present invention is a system for detecting an event within a monitored area, the system comprising: a transmitter configured to emit a first interrogation signal into the monitored area; an RF target positioned within the monitored area and configured to reflect at least some of the first interrogation signal, resulting in a target signal, when the first interrogation signal impinges on the RF target, the RF target having a switch, the switch being actuatable between (i) a first switch-state in which the RF target operates in a first reflective state, and (ii) a second switch-state in which the RF target operates in a second reflective state, the first reflective state being different from the second reflective state; a receiver configured to receive the target signal from the RF target; at least one processor communicatively coupled to the receiver; and a memory storing instructions that, when executed by the at least one processor, cause the at least one processor to: detect, based on the target signal received by the receiver, an indication of the reflective state in which the RF target is operating or an indication of a change in the reflective state in which the RF target is operating; and responsive to detecting the indication of the reflective state in which the RF target is operating or the indication of the change in the reflective state in which the RF target is operating, trigger an action.

In another embodiment, the present invention is a method for detecting an event within a monitored area, the method comprising: emitting, by a transmitter, a first interrogation signal into a monitored area within which an RF target is positioned, the RF target being configured to reflect at least some of the first interrogation signal, resulting in a target signal, when the first interrogation signal impinges on the RF target, the RF target having a switch, the switch being actuatable between (i) a first switch-state in which the RF target operates in a first reflective state, and (ii) a second switch-state in which the RF target operates in a second reflective state, the first reflective state being different from the second reflective state; receiving, by a receiver, the target signal from the RF target; detecting, by a processor, based on the target signal received by the receiver, an indication of the reflective state in which the RF target is operating or an indication of a change in the reflective state in which the RF target is operating; and triggering, by the processor, responsive to detecting the indication of the reflective state in which the RF target is operating or the change in the reflective state in which the RF target is operating, an action.

In still another embodiment, the present invention is an RF target, comprising: a first antenna element configured to receive a first interrogation signal from an RF transmitter and reflect at least some of the first interrogation signal, resulting in a target signal; and a switch reversibly actuatable between (i) a first switch-state in which the RF target operates in a first reflective state, and (ii) a second switch-state in which the RF target operates in a second reflective state, the first reflective state being different from the second reflective state.

In another embodiment, the present invention is A system for detecting an event within a monitored area, the system comprising: a transmitter configured to emit a first interrogation signal into the monitored area; a receiver configured to receive a target signal backscattered from an RF target, the RF target having a switch, the switch being actuatable between (i) a first switch-state in which the RF target operates in a first reflective state, and (ii) a second switch-state in which the RF target operates in a second reflective state, the first reflective state being different from the second reflective state; at least one processor communicatively coupled to the receiver; and a memory storing instructions that, when executed by the at least one processor, cause the at least one processor to: detect, based on the target signal received by the receiver, an indication of the first reflective state, an indication of the second reflective state, or an indication of a change from the first reflective state to the second reflective state; and responsive to detecting the indication, trigger an action.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
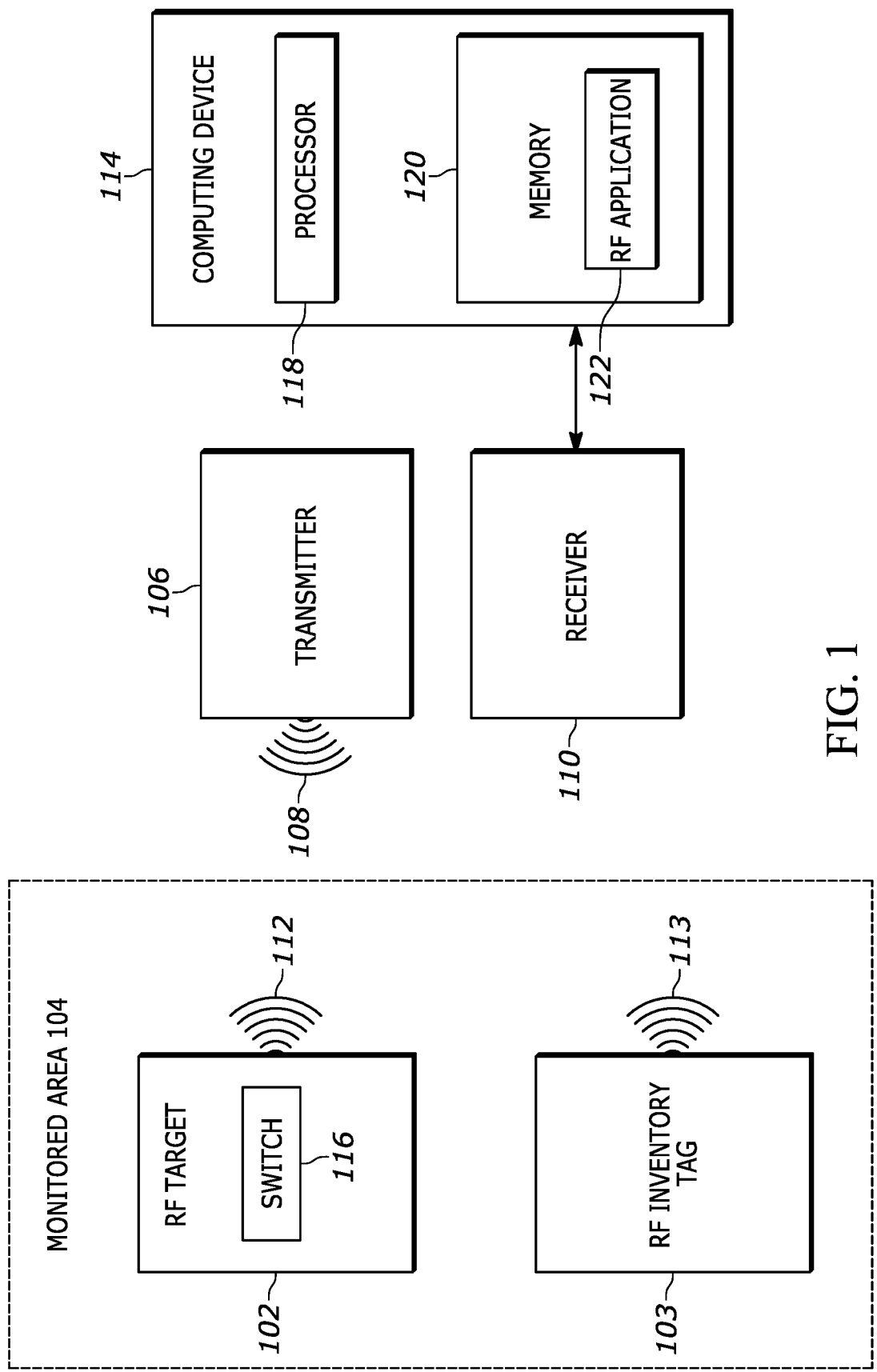
FIG. 1 illustrates an exemplary block diagram of a system for detecting an event within a monitored area, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As discussed above, some venues may monitor an area using a passive radio frequency identification (passive RFID) system. Generally speaking, these passive RFID systems comprise one or more RFID readers and a plurality of passive RFID tags. A RFID reader produces a high frequency magnetic field, called a radio signal or an interrogation signal, that is transmitted into the monitored area. One or more of the RFID tags receives the interrogation signal; draws power from the received signal to activate a chip; recalls data stored in memory and/or calculates data; analyzes the received signal to detect a command; determines a response based on the detected command and the stored and/or calculated data, and transmits the response using backscatter modulation by switching the reflection coefficient of its antenna between two states. A RFID reader then receives the tag's backscattered response to detect, singulate, communicate with, or control the RFID tag.

For instance, a venue may monitor an area using such a passive RFID system operating in accordance with EPC™ Radio-Frequency Identity Protocols Generation-2 UHF RFID standardized by GS1, Ratified Version 2.0.1 incorporated herein in its entirety. A passive RFID tag of such a system may be referred to as a Gen2 tag. For example, the RFID tag may be a passive tag which is powered only be energy received from the interrogation signal. For instance, the RFID tag may be a battery-assisted tag that operates as a passive tag to receive the interrogation signal and operate the chip but uses energy from a battery or other power source to transmit the response (this will usually increase the distance range at which the response may be received by the RFID reader). Certain RFID systems, such as Zebra's SmartLens system, monitor passive RFID tags within a monitored area and create events when an RFID tag changes from a first position to a second position. For example, this may be done is by singulating an RFID tag, estimating a first location of the tag $(x_i, y_i)$, estimating a second location of the tag $(x_j, y_j)$, then comparing the first location to the second location. If the two locations differ by more than a threshold amount (d), then it may be assumed that the RFID tag has moved, and the event or alert may be generated. A possible trigger for such an event is:

$$\{(x_i-x_j)^2+(y_i-y_j)\}>d^2$$

Moreover, as another example, movement of an RFID tag may be determined by defining a plurality of zones within the monitored area, singulating the RFID tag with a first interrogation, determining a first zone in which the RFID tag is located based on the first interrogation, singulating the RFID tag with a second interrogation, and determining a second zone in which the RFID tag is located based on the second interrogation. If the first determined zone and the second determined zone are the same, it may be assumed that the RFID tag has not moved. If the first determined zone and the second determined zone are not the same and the zones do not overlap, it may be assumed that the RFID tag has moved. Associating the RFID tag with the zone may be done by locating the RFID tag using any appropriate location estimation method (RSSI, triangulation, bearing, TOA, TDOA). For instance associating the RFID tag with the zone may be done by positioning a plurality of RFID readers within the monitored area such that a first RFID reader associated with a first zone may singulate RFID tags positioned near the first reader and a second RFID reader associated with a second zone may singulate RFID tags positioned proximate the second reader. It may be then be assumed that when an RFID tag is read by the first reader that the RFID tag is located the first zone, and when the RFID tag is read by the second reader it is located in the second zone Conventional passive RFID systems may use attributes of the received signal (such as received signal strength, phase, polarity, time of arrival, bearing, etc.) to calculate a location of the RFID tag. When those attributes of the received signal change, so will the calculated location of the tag. In conventional systems it may be assumed that the change in received signal results from a change in position of the RFID tag. However, in an embodiment of the current invention, the change in received signal may result from either or both of a change in position of the RFID tag and a change in a reflective state of the RFID tag. For example, in an embodiment, a user may activate a switch associated with the RFID tag that is configured to change the reflective state of the RFID tag in order to indicate an event occurring in a retail or inventory venue. Accordingly, in an embodiment, a change in the received signal may indicate that an event has occurred in the retail or inventory venue associated with the RFID tag.

Referring now to the drawings, FIG. 1 illustrates a block diagram of an exemplary system 100 for detecting an event within a monitored area, in accordance with an embodiment of the present invention. The system 100 includes an RF target 102 and/or an RF inventory tag 103 positioned within a monitored area 104, a transmitter 106 that emits an interrogation signal 108 into the monitored area 104, a receiver 110 that receives a target signal 112 from the RF target 102 and/or an inventory tag signal 113 from the RF inventory tag 103, and a computing device 114 that communicates with the receiver 110.

Generally speaking, when the interrogation signal 108 from the transmitter 106 impinges on the RF target 102, the RF target 102 (which may be a passive RFID tag such as a Gen2 tag) reflects at least some of the interrogation signal 108, resulting in the target signal 112. Similarly, when the interrogation signal 108 from the transmitter 106 impinges on the RF inventory tag 103, the RF inventory tag 103 (which may also be a passive RFID tag such as a Gen2 tag) reflects at least some of the interrogation signal 108, resulting in the inventory tag signal 113.

In an embodiment, the RF target 102 includes a reversibly actuatable switch 116 actuatable by a user. The switch 116 may be a lever, slider, button, or other selector associated with the RF target 102 that a user can activate and/or deactivate. Generally speaking, the switch 116 is actuatable between a first switch-state in which the RF target 102 operates in a first reflective state and a second switch-state in which the RF target 102 operates in a second reflective state that is different than the first reflective state. That is, when a user activates the switch 116, the RF target 102 changes operating states, causing the target signal 112 to change.

For instance, the RF target 102 may include a circuit (not shown) that causes the RF target 102 to operate in a particular reflective state (e.g., the first reflective state). The switch 116 may be communicatively coupled to the circuit so that an actuation of the switch 116 changes the configuration of the circuit, causing the RF target 102 to operate in another reflective state (e.g., the second reflective state). For example, actuating the switch 116 may open or close the circuit, or may change the path of current within the circuit, which in turn changes the target signal 112.

For instance, the RF target 102 may be made from a thermoformed plastic that is deformable by a user when the switch 116 is pressed but returns to its original shape when the switch 116 is released. As another example, the RF target 102 may be a folded membrane. The membrane may be printed with conductive ink, so that when the switch 116 is pressed, a conductive trace completes the circuit, but when the switch 116 is not pressed, one portion of the conductive trace moves away from the other portion of the conductive trace, and the circuit is opened.

In an embodiment, the switch 116 of the RF target 102 may be a touch sensor, an optical sensor, or a sensor that detects electrical contact from a user's finger to indicate whether a user is touching the switch 116; in such an embodiment a battery or other power source may provide energy to operate the sensor, but the RF target may still operate as a passive tag or semi-passive tag. In an embodiment, the switch 116 may be a metal shield that the user may slide in one direction to allow the RF target 102 to reflect the interrogation signal 108, and slide in the other direction to shield the RF target 102 to prevent receiving and/or reflection of the interrogation signal 108.

Accordingly, in one example, the RF target 102 may reflect at least some of the interrogation signal 108 (as the target signal 112) in the first reflective state, but may not reflect the interrogation signal 108 at all in the second reflective state. Consequently, in this example, when a user activates the switch 116, the target signal 112 appears or disappears at the receiver, that is, it is received at the receiver with a signal strength above a detection threshold or is received at the receiver 110 with a signal strength below the detection threshold, or not received at all. As another example, the RF target 102 may reflect the interrogation signal 108 at a gain above a threshold level in the first reflective state, but may reflect the interrogation signal 108 at a gain below the threshold level in the second reflective state. Accordingly, in this example, when a user activates the switch 116, the gain of the target signal 112 changes from being above the threshold level to below the threshold level (or vice versa) such that when the target signal 112 is received at the receiver 110 the signal strength changes from being above a detection threshold to below the detection threshold or not received at all.

In another example, the RF target 102 may reflect the interrogation signal 108 as a target signal 112 at a first gain in the first reflective state, but may reflect the interrogation signal 108 as a target signal 112 with a second gain in the second reflective state. Accordingly, in this example, when a user activates the switch 116, the gain of the target signal 112 changes from the first gain to the second gain. When the target signal 112 is received at the receiver 110, the change from the first gain to the second gain may be measured to detect the user interaction with the switch 116. In still another example, the RF target 102 may reflect the interrogation signal 108 as a target signal 112 with a first polarity in the first reflective state, but may reflect the interrogation signal 108 as a target signal 112 with a second polarity in the second reflective state. Consequently, in this example, when a user activates the switch 116, the polarity of the target signal 112 changes from the first polarity to the second polarity, or vice versa. When the target signal 112 is received at the receiver 110, the change from a first polarity to a second polarity may be measured to detect the user interaction with the switch 116.

In an example, the RF target 102 may be an RFID tag that includes a tag memory including location data identifying a location of the RFID tag. Some passive tags, such as some Gen2 tags, comprise memory configured to store data. Such a tag may be configured with data required by the Gen2 standard, such as EPC memory and a tag ID, but may also be configured with additional data. Such additional data may be user-defined data, application-specific data, or temporary data such as date, time, session, venue data, system data, and the like. In an embodiment, a RF target's location data may comprise a description of a position in the venue (aisle 3, shelf 4), other venue data, a date and time the tag was first read, or other additional data. In an embodiment, a RF target's location data may comprise certain portions of the EPC memory and/or the tag ID. In an embodiment, the RF target 102 may include the location data within the response transmitted as the target signal 112 in the first reflective state, but not include the location data within the response in the second reflective state. Accordingly, in this example, when a user activates the switch 116, the target signal 112 changes from not including the location data to including the location data.

Moreover, in another example, the RF target 102 may include multiple RFID tags (e.g., a first RFID tag and a second RFID tag). In this example, the RF target 102 may transmit a response associated with a first RFID tag as a target signal 112 in the first reflective state, but may transmit a response associated with the second RFID tag in the second reflective state. Consequently, in this example, when a user activates the switch 116, the target signal 112 changes from including a response associated with the first RFID tag to including a response associated with the second RFID tag, or vice versa. When the target signal 112 is received at the receiver 110, the change from the first response to the second response may be decoded to detect the user interaction with the switch 116.

Furthermore, in another example, the RF target 102 may include a first RFID tag coupled to a first antenna element and a second RFID tag coupled to a second antenna element. The RF target 102 may generate the target signal 112 via the first antenna element in the first reflective state but may generate the target signal 112 via the second antenna element in the second reflective state. Consequently, when a user activates the switch 116, the RF target 102 changes from generating the target signal 112 via the first antenna element to generating the target signal 112 via the second antenna element. When the target signal 112 is received at the receiver 110, a resulting change in polarity, signal strength, frequency, phase, direction, or other characteristics of the target signal may be detected to detect the user interaction with the switch 116.

Figure 2:
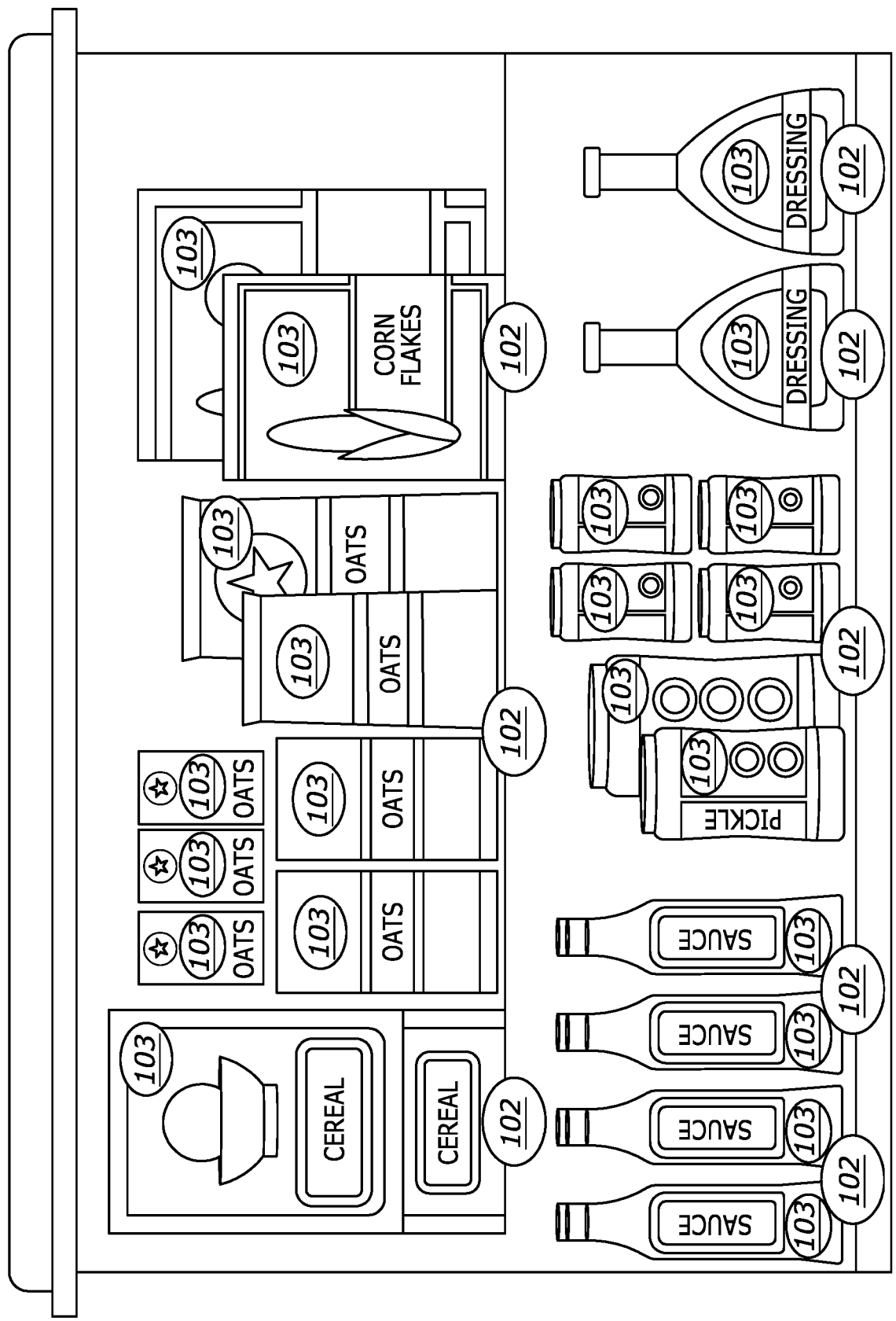
FIG. 2 illustrates an exemplary monitored area, in accordance with an embodiment of the present invention.

The monitored area 104 may be, for example, a retail venue or an inventory venue. In particular, an RF target 102 may be positioned within the monitored area 104 to indicate an association with a piece of equipment or an inventory item, and a user may activate a switch 116 of a particular RF target 102 to provide input or otherwise send a message regarding the equipment or inventory associated with the RF target 102. For instance, referring now to FIG. 2, an exemplary monitored area 104 is illustrated in accordance with an embodiment of the present invention. As shown in FIG. 2, various RF targets 102 may be positioned on shelves near inventory items, such as groceries in a retail store. In contrast, RF inventory tags 103 may be attached directly to individual inventory items in the monitored area 104. That is, while an RF target 102 may be located on a shelf that typically stores a certain brand of salad dressing, RF inventory 103 tags may be attached to individual bottles of salad dressing.

In one example, by activating a switch of an RF target 102 positioned near a particular inventory item, a user such as an employee in the retail store may indicate that the item is out of stock. In another example, by activating a switch 116 on an RF target 102 positioned near a particular inventory item, a user such as a customer may indicate that he or she needs assistance with that inventory item. Consequently, the target signal 112 from the RF target 102 changes when a user activates the switch 116 in response to seeing that the inventory item is out of stock.

As another example, a user may activate a switch 116 of an RF target 102 near or attached to a particular machine to indicate that the machine is broken and in need of repair. Accordingly, the target signal 112 from the RF target 102 changes when a user activates the switch 116 in response to seeing that the machine is broken. Moreover, as an additional example, a user may activate a switch 116 of an RF target 102 to order food for delivery to a table where the user is located (e.g., several RF targets 102 could correspond to different types of food).

Referring back to FIG. 1, generally speaking, the receiver 110 receives the target signal 112 and/or the inventory tag signal 113. In some examples, the transmitter 106 and receiver 110 may be combined as one transceiver (e.g., a narrowband transceiver or a wideband transceiver). Upon receiving the target signal 112 and/or the inventory tag signal 113, the receiver 110 decodes a response or other data from the target signal 112 and/or the inventory tag signal 113 then transmits or otherwise provides the decoded data to the computing device 114.

The computing device 114 may be, for example, a server, a hub, a personal computer, a portable device such as a tablet computer or smartphone, a wearable computing device, etc., and may be connected to the receiver 110 via a wire, wireless interface, bus, network interface, or internet cloud. In an embodiment, the receiver 110 is a RFID transceiver and the computing device 114 is an RFID reader. As illustrated in FIG. 1, the computing device 114 may include processing hardware such one or more processors 118 (which may be, e.g., microcontrollers and/or microprocessors) and a memory 120. The memory 120 of the computing device 114 may be a non-transitory memory and may include one or several suitable memory modules, such as random access memory (RAM), read-only memory (ROM), flash memory, SD card, other types of persistent memory, etc. The memory 120 may further include an RF application 122.

The RF application 122 may analyze the target signal 112 to obtain response data associated with the RF target 102 that transmitted the target signal 112, and/or may analyze the inventory tag signal 113 to obtain response data associated with the RF inventory tag 103. For example, when the RF target 102 is a passive RFID tag, the response data may include information such as the tag UID, a tag application ID, a tag location, tag variable data, etc. For example, the RF application 122 may determine that the response data is from an RF target 102 and/or an RF inventory tag 103 in the monitored area 104 by comparing the tag UID to a list of tag UID known to be RF targets that are positioned in the monitored area 104. Moreover, in some examples, a particular tag UID or application ID may be associated with an inventory item near which the RF target 102 is positioned, e.g., in a retail venue or in a warehouse venue.

In particular, the RF application 122 may be configured to detect changes in an operation of the RF target 102 (and/or indications of the reflective state in which the RF target 102 is operating) based on changes in the target signal 112 received by the receiver 110 and trigger actions responsive to changes in the operation of the RF target 102 (e.g., changes in the operation of the RF target 102 caused by an actuation of a switch 116 associated with the RF target 102).

For example, as discussed above, changes in the target signal 112 may include, e.g., a change in whether the receiver 110 receives a target signal 112, a change in the gain of the target signal 112 (e.g., from above a threshold gain to below the threshold gain, or vice versa), a change in the polarity of the target signal 112, a change in location data or other data in the response included in the target signal 112 etc. Based on detecting such a change in the target signal 112, the RF application 122 may trigger various actions, such as, e.g., placing a work order for a broken machine, placing an order for inventory that is out of stock, notifying an employee that someone has requested assistance, transmitting a food order to be displayed in a kitchen of a restaurant, etc.

Moreover, in some examples, changes in the target signal 112 may include, e.g., a repetitive change in the reflective state in which the RF target is operating (e.g., multiple changes in the reflective state in which the RF target 102 is operating over a certain period of time). In an embodiment, an additional or alternative action may be triggered based on such a repetitive change.

In some examples, the RF application 122 may trigger an action based on both the change in the target signal 112 and the location of the RF target 102 within the monitored area 104. For instance, RF application 122 may determine the location of the RF target 102 within the monitored area 104 based on the fact that the RF target 102 is at a known, fixed position associated with a location that is stored in memory (e.g., stored in a memory (not shown) of the RF target 102 itself, stored in memory 120 as a location associated with an identification number for a particular RF target 102, etc.).

In examples in which the receiver 110 is at a known, fixed position, the RF application 122 may determine the location of the RF target 102 within the monitored area 104 based on the location of the receiver 110. That is, when the receiver 110 receives a target signal 112 from the RF target 102, the RF target 102 must be near the receiver 110.

As still another example, when the receiver 110 is at a known, fixed position, the RF application 122 may determine the location of the RF target 102 within the monitored area 104 based on the direction and the strength of the target signal 112. That is, the RF application 122 may analyze the strength and direction of the emitted interrogation signal and the received strength and direction of the target signal 112 to determine a bearing of the target signal 112 from the receiver 110 to the RF target 102.

Moreover, in examples in which the receiver 110 is mobile (i.e., not fixed) but has a location that can be determined using a locationing system, such as WiFi RSSI, GPSWAN triangulation, or ultrasonic, the RF application 122 may determine the location of the RF target 102 within the monitored area 104 by first determining the location of the mobile receiver 110 using the locationing system. That is, as discussed above, when the receiver 110 receives a target signal 112 from the RF target 102, the RF target 102 must be near the mobile receiver 110.

Furthermore, in some examples, a wideband locationing system may further monitor the monitored area 104. In such examples, a wideband transceiver may transmit a wideband RF locationing signal which is reflected by the RF target 102 as a target signal 112 that is subsequently received by the wideband locationing system. Accordingly, the RF application 122 may determine the location of the RF target 102 within the monitored area 104 by triangulating the target signal 112 received by the wideband locationing system using time of arrival (TOA) or time difference of arrival (TDOA) triangulation methods. In an embodiment, the RF target 102 may be instructed by the RFID transmitter 106 to switch between different reflective states. For example, in the first reflective state the wideband RF locationing signal is reflected by the RF target 102, but in the second reflective state the wideband RF locationing signal is not reflected by the RF target 102. The change from the first reflective state to the second reflective state (or vice versa) as determined by the passive RFID system or a computing device in communication with the passive RFID system, together with the location estimate determined by the wideband locationing system, is used to detect the user interaction.

As discussed above, RFID inventory tags 103 may be used to identify or track inventory items in a venue such as the monitored area 104. Because inventory items may move, some passive RFID systems may locate RF inventory tags 103 to track an inventory item. In various embodiments, it may be desirable to differentiate RF inventory tags 103 used for inventory items from RF targets 102 configured to indicate events. In particular, an RF target 102 may include memory for storing data. Memory may be written with data to indicate that the RF target 102 is expected to be stationary: a RF target type or category, a tag application ID, a data structure different than the data structures used for RF inventory tags 103 expected to move, or a location at which the fixed-position RF target was placed may be written to the memory. When the RF application 122 locates the RF target 102 it uses such data to improve the estimate of the location and/or the reflective state.

For instance, an RFID reader that singulates two RFID tags may read tag type data from each tag and find that one tag is an RF target 102 that is expected to remain stationary but change reflective state, and a second tag is an RF inventory tag 103 that may be moved but has only a single reflective state. The RF application 122 may locate the second tag using standard locating algorithms, and may further locate the first tag based on data read from the tag together with attributes of the received signal in one of the two reflective states. The RF application 122 may further use a detected change in the received signal from the first tag to determine that there has been a change in the reflective state of the RF target 102 and to determine that the change may have been initiated by a user interaction with a switch of the RF target 102. Accordingly, the RF application 122 may generate an event or alert based on the change. In an embodiment, the stationary-indicative data may be associated with a unique identifier (UID) of the RF target 102 and stored in memory at a reader, at a computing device, at a cloud-based database etc. instead of on the RF target itself. In this embodiment, the UID of the RF target 102 could be determined from the target signal 112, then that UID could be compared with the stored data to conduct the comparison.

In an embodiment, differentiating a change in reflective state from a change in position may be achieved without analyzing stored data. For instance, an RF application 122 may determine a first location of a first RFID tag and a second location of the first RFID tag during a first time period only one-half second later than the first time period. If the second location differs from the first location by 75 centimeters it may be assumed that the tag moved, because movement of 75 cm in one-half second is approximately the walking speed of a human. However, if the second location differs from the first location by 75 feet it is unlikely that the RFID tag moved at the speed of 102 miles per hour, it is more likely that the RFID tag is stationary but there was a change in the reflective state of the tag. By comparing the calculated speed to a threshold speed, the RF application 122 may determine both the type of tag (e.g., RF target 102 or inventory tag 103) and, for an RF target 102, the RF application 122 may further determine that an event has occurred.

In an embodiment, an RF application 122 may determine a first location of a first RFID tag and a second location of the first RFID tag during a first time period only one-half second later than the first time period. If the second location is within a second zone of the monitored area near a first zone of the first location it may be assumed that the tag moved, but if the second location is within a zone of the monitored area far from the first zone or even outside the monitored area entirely, it is more likely that the RFID tag is stationary but there was a change in the reflective state of the tag. By comparing the change in location to a threshold of location or a map of zones for the monitored area, the RF application 122 may determine whether an event has occurred.

Figure 3A:
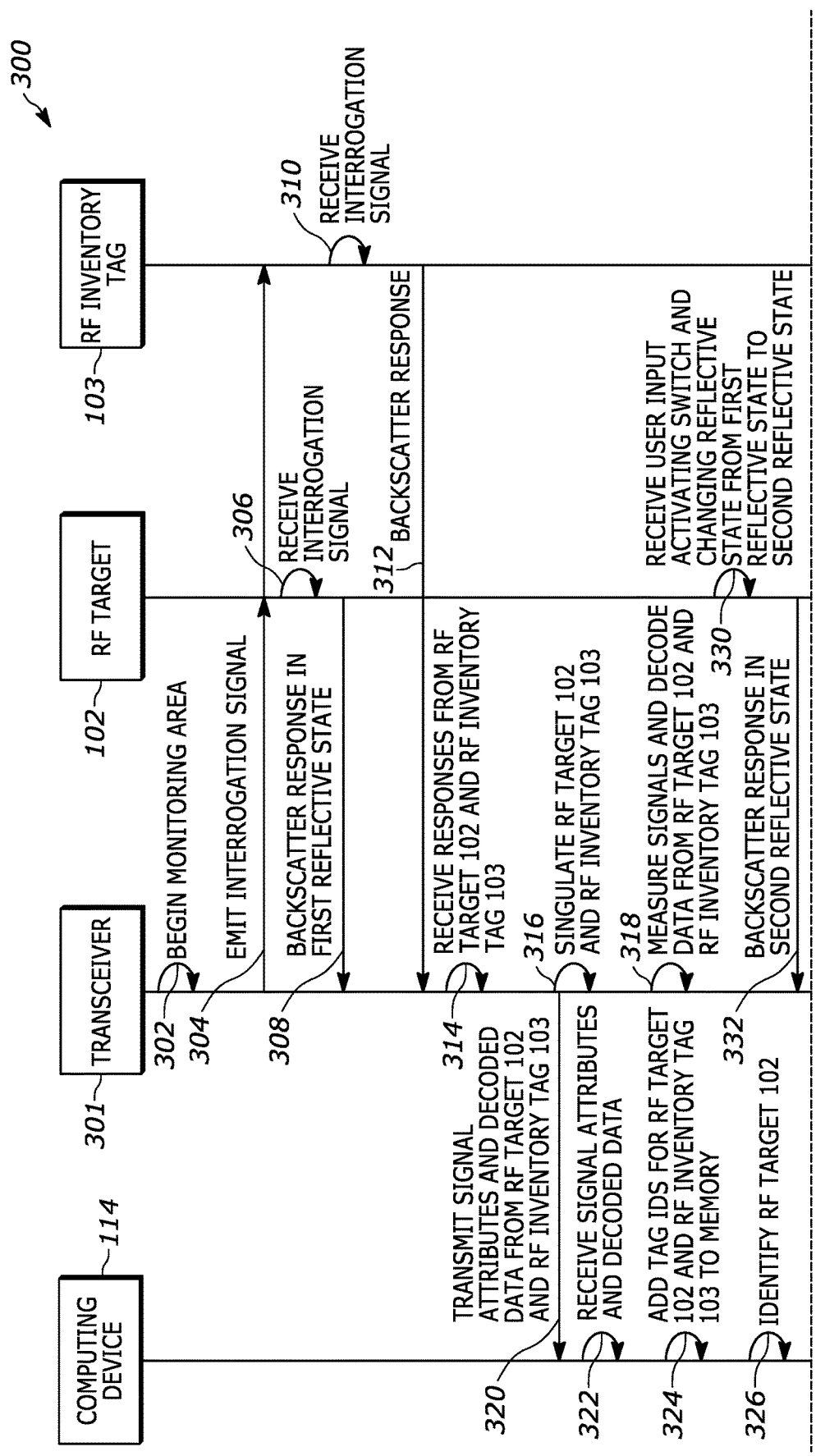
FIGS. 3A-3B illustrates a signal diagram associated with an exemplary process for detecting an event within a monitored area, in accordance with an embodiment of the present application.
Figure 3B:
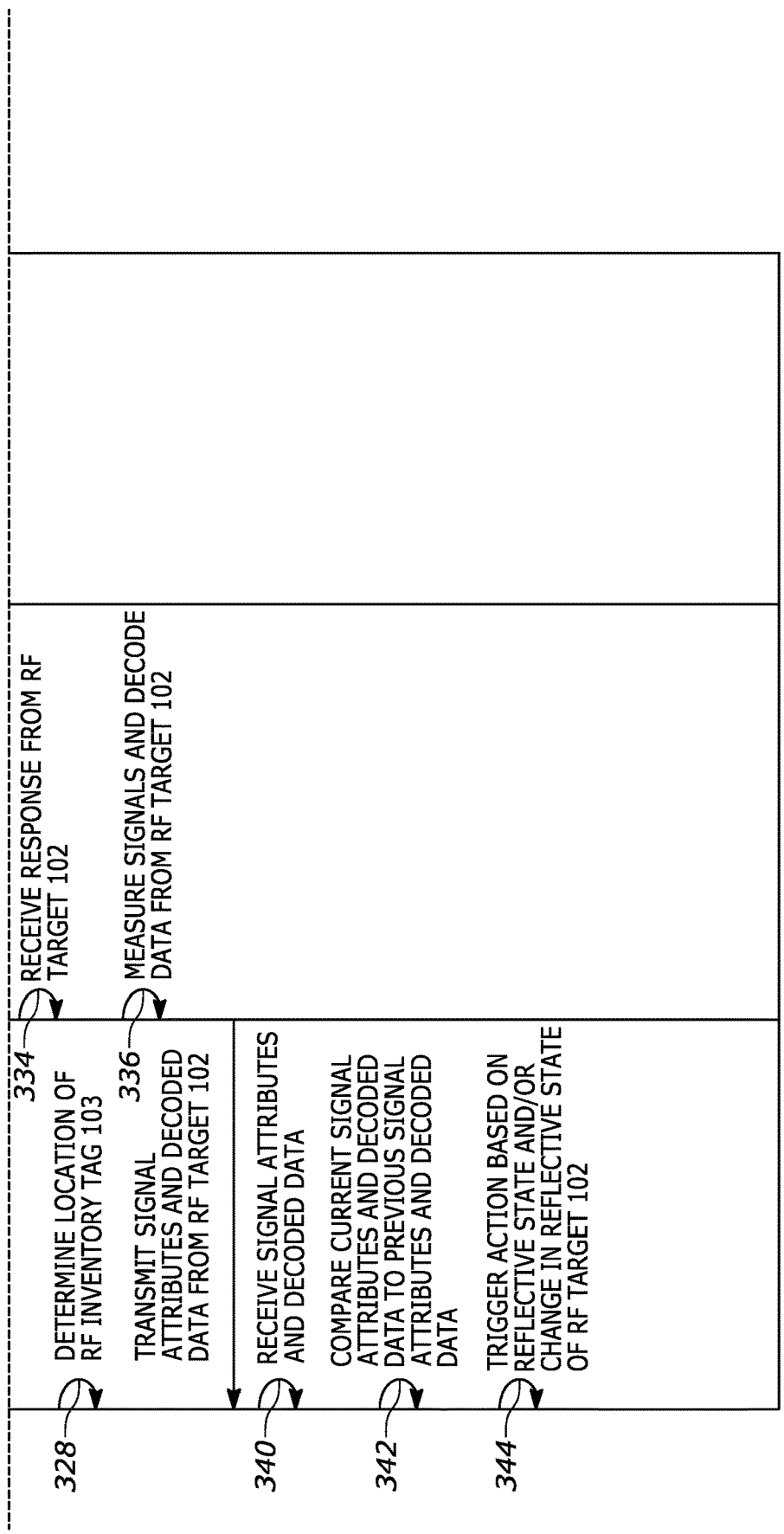

Referring now to FIG. 3, a signal diagram associated with an exemplary process 300 for detecting an event within a monitored area is illustrated in accordance with an embodiment of the present application. The exemplary process 300 includes communication between an RF target 102, an RF inventory tag 103, a computing device 114, and a transceiver 301. For example, the transceiver 301 may be a combination of the transmitter 106 and the receiver 110. In some embodiments, some of the actions described as performed by the transceiver 301 may be performed by the transmitter 106 and/or the receiver 110.

The process 300 may begin when the transceiver 301 begins (line 302) monitoring the monitored area 104. The transceiver 301 emits (line 304) an interrogation signal 108 within the monitored area 104, such that the interrogation signal 108 impinges on the RF target 102 and the RF inventory tag 103. That is, the RF target receives (line 306) the interrogation signal 108 and backscatters (line 308) a response (e.g., target signal 112) to the transceiver 301. In the example shown in FIGS. 3A and 3B, the RF target 102 operates in a first reflective state, and accordingly, backscatters a response in the first reflective state. Furthermore, the RF inventory tag 103 also receives (block 310) the interrogation signal 108, and backscatters (line 312) a response (e.g., inventory tag signal 113) to the transceiver 301.

The transceiver 301 receives (line 314) the backscattered responses from the RF target 102 and the RF inventory tag 103. Next, the transceiver 301 singulates (line 316) the RF target 102 and the RF inventory tag 103. Furthermore, the transceiver 301 measures signals and decodes data (line 318) associated with the RF target 102 and the RF inventory tag 103 respectively. The transceiver 301 then transmits (line 320) the signal attributes and decoded data associated with the RF target 102 and the RF inventory tag 103 to the computing device 114.

The computing device 114 receives (line 322) the signal attributes and decoded data associated with the RF target 102 and the RF inventory tag 103 and adds (line 324) tag IDs associated with the RF target 102 and the RF inventory tag 103 to memory 120. The computing device 104 then identifies (line 326) the RF target 102 and determines (line 328) a location of the RF inventory tag 103.

The RF target 102 may receive (line 330) user input, e.g., a user activating a switch 116 of the RF target 102, causing the RF target 102 to change from operating in the first reflective state to operating in a second reflective state. The RF target 102, still receiving the interrogation signal 108 emitted (line 304) by the transceiver 301, backscatters (line 332) a response (e.g., target signal 112) in the second reflective state.

The transceiver 301 receives (line 334) the response from the RF target 102. Furthermore, the transceiver 301 measures signals and decodes data (line 336) from the RF target 102. The transceiver 301 then transmits (line 338) the signal attributes and decoded data associated with the RF target 102 to the computing device 114.

The computing device 114 receives (line 340) the signal attributes and decoded data associated with the RF target 102. The computing device 114 then compares (line 342) the current signal attributes and decoded data associated with the RF target 102 to the previous signal attributes and decoded data associated with the RF target 102. Accordingly, the computing device 114 may trigger (line 344) an action based on the comparison—e.g., based on the new reflective state associated with the RF target 102, and/or based on the change in reflective state associated with the RF target 102.

Figure 4:
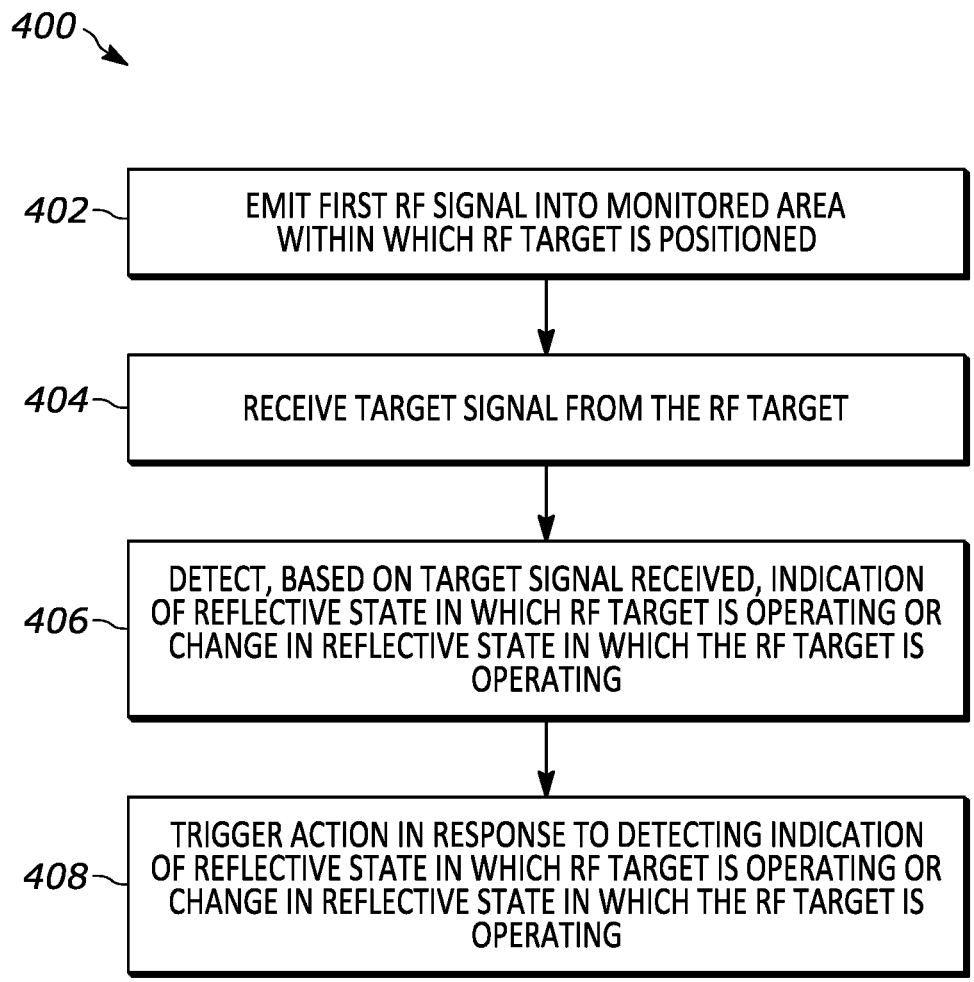
FIG. 4 illustrates an exemplary flow diagram of a method for detecting an event within a monitored area, in accordance with an embodiment of the present application.

Referring now to FIG. 4, an exemplary flow diagram 400 of a method for detecting an event within a monitored area is illustrated in accordance with an embodiment of the present application. One or more of the steps of the method 400 may be implemented as a set of instructions stored on a computer-readable memory and executable on one or more processors.

An RF interrogation signal 108 is emitted (block 402) into a monitored area 104 within which an RF target 102 is positioned. For instance, the RF target 102 may be a passive RFID tag. Generally speaking, the RF target 102 is configured to reflect at least some of the interrogation signal 108, resulting in a target signal 112, when the interrogation signal impinges on the RF target. Moreover, the RF target has a switch 116 actuatable by a user. The switch 116 is actuatable between (i) a first switch-state in which the RF target operates in a first reflective state, and (ii) a second switch-state in which the RF target operates in a second (different) reflective state. In some embodiments, the change in the operation of the RF target may be associated with the user actuating a reversibly actuatable switch of the RF target.

In one example, the RF target 102 is configured to reflect at least some of the interrogation signal 108 as a target signal 112 in the first reflective state, and the RF target 102 is configured to not reflect the interrogation signal 108 in the second reflective state. In an embodiment, the RF target 102 is configured to reflect the interrogation signal 108 as a target signal 112 with a first gain in the first reflective state, and the RF target 102 is configured to reflect the interrogation signal 108 as a target signal 112 with a second gain below the first gain in the second reflective state. In an embodiment, the RF target 102 is configured to reflect the interrogation signal 108 as a target signal 112 with a first polarity in the first reflective state, and the RF target 102 is configured to reflect the interrogation signal 108 as a target signal 112 with a second polarity in the second reflective state.

In another example, the RF target 102 includes a circuit configured to cause the RF target 102 to operate in a particular reflective state (i.e., the first reflective state or the second reflective state), and the switch 116 is communicatively coupled to the circuit such that an actuation of the switch 116 causes the circuit to operate in a respective state that further causes the RF target 102 to operate in the particular reflective state. In an embodiment, the switch 116 may be reversibly actuatable by a user.

In some examples, the RF target 102 is an RFID tag that includes a tag memory including location data identifying a location of the RFID target. In one of the first or second reflective states, the RFID tag transmits the location data. In some instances, the RFID tag does not transmit location data in the other reflective state.

In an embodiment, the RF target 102 includes a first RFID tag and a second RFID tag. When operating in the first reflective state, the RF target 102 transmits data associated with the first RFID tag; when operating in the second reflective state, the RF target transmits data associated with the second RFID tag.

In an embodiment, the RF target 102 includes a first antenna element and a second antenna element. When operating in the first reflective state, the RF target is configured to generate the target signal via the first antenna element; when operating in the second reflective state, the RF target is configured to generate the target signal via the second antenna element. For example, the RF target may include a first RFID chip communicatively coupled to the first antenna element and a second RFID chip communicatively coupled to the second antenna element.

The RF target 102 reflects the interrogation signal 108 as a target signal 112 such that the target signal 112 is received (block 404) from the RF target 102, and an indication of the reflective state in which the RF target 102 is operating and/or an indication of a change in the reflective state in which the RF target 102 is operating is detected (block 406) based on the target signal 112 received by the receiver 110. For example, the change in the operation of the RF target 102 may be a change from the RF target 102 changing from operating in the first reflective state to the RF target 102 operating in the second reflective state, or vice versa.

In some examples, the change in the operation of the RF target 102 may be a repetitive change in the operation of the RF target 102. The repetitive change in the operation of the RF target 102 may be at least two instances of the change in the operation of the RF target 102. For instance, the repetitive change may be a number of changes in the operation of the RF target 102 that exceeds a threshold number of changes for a given period of time.

In response to detecting the indication of the reflective state in which the RF target 102 is operating and/or the indication of the change in the reflective state in which the RF target 102 is operating, an action may be triggered (block 408). In some examples, in response to detecting a repetitive change in the operation of the RF target 102, another (second or different) action may be triggered. For instance, the second or different action may be triggered in response to detecting the repetitive change in the operation of the RF target 102 at or above a predetermined rate.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system for detecting an event within a monitored area, the system comprising:
   a transmitter configured to emit a first interrogation signal into the monitored area;
   an RF target positioned within the monitored area and configured to reflect at least some of the first interrogation signal, resulting in a target signal, when the first interrogation signal impinges on the RF target, the RF target having a switch, the switch being actuatable between (i) a first switch-state in which the RF target operates in a first reflective state, and (ii) a second switch-state in which the RF target operates in a second reflective state, the first reflective state being different from the second reflective state;
   a receiver configured to receive the target signal from the RF target;
   at least one processor communicatively coupled to the receiver; and
   a memory storing instructions that, when executed by the at least one processor, cause the at least one processor to:
      detect, based on the target signal received by the receiver, an indication of the reflective state in which the RF target is operating or an indication of a change in the reflective state in which the RF target is operating; and
      responsive to detecting the indication of the reflective state in which the RF target is operating or the indication of the change in the reflective state in which the RF target is operating, trigger an action,
   wherein at least one of:
      in the first reflective state the RF target is configured to reflect the first interrogation signal at a first gain and in the second reflective state the RF target is configured to reflect the first interrogation signal at a second gain below the first gain; or
      in the first reflective state the RF target is configured to reflect the first interrogation signal with a first polarity and in the second reflective state the RF target is configured to reflect the first interrogation signal with a second polarity.

2. The system of claim 1, wherein the switch is configured to be actuated by a user.

3. The system of claim 1, wherein the RF target includes a circuit configured to cause the RF target to operate in one of the first reflective state and the second reflective state, and wherein the switch is communicatively coupled to the circuit such that an actuation of the switch causes the circuit to operate in a respective state that further causes the RF target to operate in one of the first reflective state and the second reflective state.

4. The system of claim 1, wherein, in the first reflective state, the RF target is configured to reflect at least some of the first interrogation signal, and wherein, in the second reflective state, the RF target is configured to not reflect the first interrogation signal.

5. The system of claim 1, wherein the RF target is an RF identification (RFID) tag.

6. The system of claim 5, wherein the RFID tag includes a tag memory, the tag memory including location data identifying a location of the RFID tag, and
   wherein, in the second reflective state, the RFID tag transmits the location data.

7. The system of claim 1, wherein the RF target includes a first RF identification (RFID) tag and a second RFID tag, wherein, when operating in the first reflective state, the RF target transmits data associated with the first RFID tag, and
   wherein, when operating in the second reflective state, the RF target transmits data associated with the second RFID tag.

8. The system of claim 1, wherein the RF target comprises a first antenna element and a second antenna element,
   wherein, when operating in the first reflective state, the RF target is configured to generate the target signal via the first antenna element, and
   wherein, when operating in the second reflective state, the RF target is configured to generate the target signal via the second antenna element.

9. The system of claim 8, wherein the RF target includes a first RF identification (RFID) tag communicatively coupled to the first antenna element and a second RFID tag communicatively coupled to the second antenna element.

10. The system of claim 1, wherein the memory stores further instructions that, when executed by the at least one processor, cause the at least one processor to:
    detect, based on the target signal received by the receiver, a repetitive change in the reflective state in which the RF target is operating, the repetitive change being at least two instances of the change in the reflective state in which the RF target is operating; and
    responsive to detecting the repetitive change in the reflective state in which the RF target is operating, trigger another action.

11. The system of claim 10, wherein the memory stores further instructions that, when executed by the at least one processor, cause the at least one processor to:
    responsive to detecting the repetitive change in the reflective state in which the RF target is operating at or above a predetermined rate, trigger the another action.

12. A method for detecting an event within a monitored area, the method comprising:
    emitting, by a transmitter, a first interrogation signal into a monitored area within which an RF target is positioned, the RF target being configured to reflect at least some of the first interrogation signal, resulting in a target signal, when the first interrogation signal impinges on the RF target, the RF target having a switch, the switch being actuatable between (i) a first switch-state in which the RF target operates in a first reflective state, and (ii) a second switch-state in which the RF target operates in a second reflective state, the first reflective state being different from the second reflective state;
    receiving, by a receiver, the target signal from the RF target;
    detecting, by a processor, based on the target signal received by the receiver, an indication of the reflective state in which the RF target is operating or an indication of a change in the reflective state in which the RF target is operating; and
    triggering, by the processor, responsive to detecting the indication of the reflective state in which the RF target is operating or the change in the reflective state in which the RF target is operating, an action
    wherein at least one of:
       in the first reflective state the RF target is configured to reflect the first interrogation signal at a first gain and in the second reflective state the RF target is configured to reflect the first interrogation signal at a second gain below the first gain; or in the first reflective state the RF target is configured to reflect the first interrogation signal with a first polarity and in the second reflective state the RF target is configured to reflect the first interrogation signal with a second polarity.

13. The method of claim 12, wherein the switch is configured to be actuated by a user.

14. The method of claim 12, wherein the RF target includes a circuit configured to cause the RF target to operate in one of the first reflective state and the second reflective state, and wherein the switch is communicatively coupled to the circuit such that an actuation of the switch causes the circuit to operate in a respective state that further causes the RF target to operate in one of the first reflective state and the second reflective state.

15. The method of claim 12, wherein, in the first reflective state, the RF target is configured to reflect at least some of the first interrogation signal, and wherein, in the second reflective state, the RF target is configured to not reflect the first interrogation signal.

16. The method of claim 12, wherein the RF target is an RF identification (RFID) tag.

17. An RF target, comprising:
a first antenna element configured to receive a first interrogation signal from an RF transmitter and reflect at least some of the first interrogation signal, resulting in a target signal; and
a switch reversibly actuatable between (i) a first switch-state in which the RF target operates in a first reflective state, and (ii) a second switch-state in which the RF target operates in a second reflective state, the first reflective state being different from the second reflective state
wherein at least one of:
in the first reflective state the RF target is configured to reflect the first interrogation signal at a first gain and in the second reflective state the RF target is configured to reflect the first interrogation signal at a second gain below the first gain; or
in the first reflective state the RF target is configured to reflect the first interrogation signal with a first polarity and in the second reflective state the RF target is configured to reflect the first interrogation signal with a second polarity.

18. The RF target of claim 17, wherein the switch is configured to be actuated by a user.

19. The RF target of claim 17, wherein the RF target includes a circuit configured to cause the RF target to operate in one of the first reflective state and the second reflective state, and wherein the switch is communicatively coupled to the circuit such that an actuation of the switch causes the circuit to operate in a respective state that further causes the RF target to operate in one of the first reflective state and the second reflective state.

20. The RF target of claim 17, wherein, in the first reflective state, the RF target is configured to reflect at least some of the first interrogation signal, and wherein, in the second reflective state, the RF target is configured to not reflect the first interrogation signal.

21. The RF target of claim 17, wherein the RF target is an RF identification (RFID) tag.

22. The RF target of claim 21, wherein the RFID tag includes a tag memory, the tag memory including location data identifying a location of the RFID tag, and
wherein, in the second reflective state, the RFID tag transmits the location data.

23. The RF target of claim 21, wherein the RFID tag includes a tag memory, the tag memory including a tag UID and a tag application ID, and
wherein, in the first reflective state, the RFID tag transmits the tag application ID.

24. The RF target of claim 17, wherein the RF target includes a first RF identification (RFID) tag and a second RFID tag,
wherein, when operating in the first reflective state, the RF target transmits data associated with the first RFID tag, and
wherein, when operating in the second reflective state, the RF target transmits data associated with the second RFID tag.

25. The RF target of claim 17, wherein the RF target further comprises a second antenna element,
wherein, when operating in the first reflective state, the RF target is configured to generate the target signal via the first antenna element, and
wherein, when operating in the second reflective state, the RF target is configured to generate the target signal via the second antenna element.

26. The RF target of claim 25, wherein the RF target includes a first RF identification (RFID) tag communicatively coupled to the first antenna element and a second RFID tag communicatively coupled to the second antenna element.

27. A system for detecting an event within a monitored area, the system comprising:
a transmitter configured to emit a first interrogation signal into the monitored area;
a receiver configured to receive a target signal backscattered from an RF target, the RF target having a switch, the switch being actuatable between (i) a first switch-state in which the RF target operates in a first reflective state, and (ii) a second switch-state in which the RF target operates in a second reflective state, the first reflective state being different from the second reflective state;
at least one processor communicatively coupled to the receiver; and
a memory storing instructions that, when executed by the at least one processor, cause the at least one processor to:
detect, based on the target signal received by the receiver, an indication of the first reflective state, an indication of the second reflective state, or an indication of a change from the first reflective state to the second reflective state; and
responsive to detecting the indication, trigger an action
wherein at least one of:
in the first reflective state the RF target is configured to reflect the first interrogation signal at a first gain and in the second reflective state the RF target is configured to reflect the first interrogation signal at a second gain below the first gain; or
in the first reflective state the RF target is configured to reflect the first interrogation signal with a first polarity and in the second reflective state the RF target is configured to reflect the first interrogation signal with a second polarity.

28. The system of claim 27, wherein the indication of the first reflective state is detecting at least some of the target signal, and wherein the indication of the second reflective state is not detecting the target signal.

29. The system of claim 27, wherein the target signal comprises a tag UID and a tag application ID indicating that the RF target is not expected to move.

30. The system of claim 27, wherein the target signal comprises a tag UID and location data identifying a location of the RF target.

31. The system of claim 27, wherein the indication of the first reflective state is detecting a first RFID tag UID, and
   wherein the indication of the second reflective state is detecting a second RFID tag UID.

32. The system of claim 27, wherein the memory stores further instructions that, when executed by the at least one processor, cause the at least one processor to:
   detect, based on the target signal received by the receiver, a repetitive change in the reflective state in which the RF target is operating, the repetitive change being at least two instances of the change in the reflective state in which the RF target is operating; and
   responsive to detecting the repetitive change in the reflective state in which the RF target is operating, trigger another action.

33. The system of claim 32, wherein the memory stores further instructions that, when executed by the at least one processor, cause the at least one processor to:
   responsive to detecting the repetitive change in the reflective state in which the RF target is operating at or above a predetermined rate, trigger the another action.

34. The system of claim 27 further comprising a housing carrying both the transmitter and the receiver.

35. The system of claim 27 further comprising a first housing carrying the receiver and a second hosing carrying the transmitter.

\* \* \* \* \*